United States Patent
Low et al.

[15] 3,671,497
[45] June 20, 1972

[54] POLYURETHANE RESINS FROM HYDROXY TERMINATED PERFLUORO ETHERS

[72] Inventors: George M. Low, Acting Administrator of the National Aeronautics and Space Administration with respect to an invention of; Eugene C. Stump, Jr., Gainesville, Fla.; Stephen Eugene Rochow, Ann Arbor, Mich.

[22] Filed: Dec. 18, 1970

[21] Appl. No.: 99,524

Related U.S. Application Data

[62] Division of Ser. No. 770,398, Oct. 24, 1968, Pat. No. 3,574,770.

[52] U.S. Cl. ................................. 260/77.5 AP, 260/535 H
[51] Int. Cl. ................................. C08g 22/14, C08g 22/16

[58] Field of Search ........................................... 260/77.5 AP

[56] References Cited

UNITED STATES PATENTS 3,475,384  10/1969  Trischler ............................... 260/77.5

Primary Examiner—Donald E. Czaja
Assistant Examiner—M. J. Welsh
Attorney—John R. Manning, Monte F. Mott and Wilfred Grifka

[57] ABSTRACT

Hydroxy terminated perfluoro ethers and polyurethane resins incorporating the structure $$-CH_2CF(CF_3)[OCF_2CF(CF_3)]_mO(CF_2)_pO[CF(CF_3)CF_2O]_nCF(CF_3)CH_2-$$

where $p$ is an integer of 2 to 12 and
$m$ and $n$ are integers whose sum is from 0 to 20.

4 Claims, No Drawings

3,671,497

POLYURETHANE RESINS FROM HYDROXY TERMINATED PERFLUORO ETHERS

CROSS-REFERENCE TO RELATED APPLICATION

This application is a divisional application of application Ser. No. 770,398, filed Oct. 24, 1968. U.S. Pat. No. 3,574,770, issued Apr. 13, 1971.

ORIGIN OF THE INVENTION

The invention described herein was made in the performance of work under a NASA contract and is subject to the provisions of Section 305 of the National Aeronautics and Space Act of 1958, Public Law 83-568 (72 Stat. 435; 42 USC 2457).

BACKGROUND OF THE INVENTION

1. Field of the Invention

This invention is in the field of new perfluorinated ether materials, more particularly the invention relates to a new hydroxy terminated perfluoroether and a polyurethane resin derived from that ether.

2. Description of the Prior Art

Highly fluorinated polymers are of particular interest because they tend to possess outstanding chemical resistance with good thermal properties and non-flammability. These properties are attributable mainly to the presence of the fluorine atoms in the polymer chain. As a result, polymers that are perfluorinated would possess the maximum foregoing properties.

There is disclosed in U.S. Pat. No. 3,250,807 the diacid fluoride precursors of the herein invention having the general formula

where $p$ = integer of 2 to 12, $m + n$ = integers of 0 to 20.

That patent disclosed utilization for these ethers as chemical intermediates. As indicated therein, the materials would have outstanding thermal and chemical properties when utilized as dispersing agents and the like. Further, the patent indicated that due to the particular end group structure, i.e.,

the materials could be decarboxylated, to result in vinyl ethers which would have utility as monomers in the formation of thermosetting resins. There was no appreciation of the conversion of the carboxyl grouping to a hydroxyl one and the subsequent utilization of the hydroxyl terminated material in the formation of novel polyurethane resins.

3. Objects of the Invention

An object of this invention is to provide novel hydroxyl terminated perfluoroethers useful as intermediates in forming new polymers.

Another object of this invention is to provide new highly fluorinated polyurethane resins.

SUMMARY OF THE INVENTION

The herein invention involves the initial formation of highly fluorinated diols containing ether linkages and having the general formula

These materials are prepared by reducing the acid fluoride terminated precursors formed in accord with the description in the aforegoing mentioned U.S. Pat. No. 3,250,807, by reaction with a reducing agent such as lithium aluminum hydride or an alkali metal borohydride. The hydroxyl terminated ethers are useful as intermediates in the preparation of various materials and particularly in the formation of polymers. They have been utilized to formulate new and novel polyurethanes by reacting these diols with a suitable diisocyanate. Of particular importance is the formation of highly fluorinated polyurethanes where the diols of this invention are reacted with the highly fluorinated diisocyanates such as tetrafluoro-m-phenylene diisocyanate.

DESCRIPTION OF THE PREFERRED EMBODIMENTS

As indicated, the preparation of the acid fluoride terminated precursors of the herein invention is thoroughly described in U.S. Pat. No. 3,250,807. Basically, the materials are prepared by the reaction of diacid fluorides with hexafluoropropylene epoxide in the presence of a suitable catalyst such as cesium fluoride. The precursors are one of a fraction of the products obtained from that reaction. A specific example of forming the precursors involves the reaction of hexafluoropropylene oxide with perfluoroglutaryl fluoride in the presence of cesium fluoride and a suitable solvent.

The precursor acid fluoride terminated ethers are converted to diols in accord with the herein invention by reduction through the use of a material such as alkali metal borohydride or an aluminum hydride. Reduction takes place in the presence of an inert solvent such as dioxane or diethyleneglycol dimethyl ether. The diacid fluoride starting material is usually added dropwise to the solution of the solvent and reducing agent mixture. The temperature at which the reduction is carried out is not critical. Normally, the reactants are heated to a temperature not in excess of the boiling temperature of the solvent. Usually the reactants are stirred during the reaction for a period of up to 3 hours. At the end of this time, water is preferably added to remove any excess borohydride present. This is then followed by a separation of the desired end product.

The diol products produced from the aforegoing described reduction can be then utilized to form new polyurethanes by reacting them with suitable diisocyanates. Any diisocyanate conventionally utilized to produce polyurethane resins is contemplated. This includes toluene diisocyanate including mixtures of its isomers such as the 2,4 and 2,6 isomers. Further contemplated is diphenylmethane-4,4'-diisocyanate. Particularly, it is desirable in the herein invention to utilize diisocyanate to obtain a maximum amount of fluorine atoms. The extremely good high temperature properties, nonflammability and the like can be attributed to the presence of fluorine atoms in the polymer chains. Thus, if the diisocyanate also contains a high substitution of fluorine atoms, one obtains a polymer containing the desired properties. Thus, it is preferred to use diisocyanates such as tetrafluoro-m-phenylene diisocyanate, tetrafluoro-p-phenylene diisocyanate, perfluorotrimethylene diisocyanate, 1-chloro-2,4-diisocyanato-3,5,6-trifluorobenzene and the like.

The resultant polymers will range from sticky semi-solids to tough brittle sheets depending upon the amount of diisocyanate utilized in the extension and cross-linking reaction that transpires between it and the diols. It should be noted that although the hardness of the resultant polymers increases with the increasing ratio of diisocyanate to diol, the glass temperature of the resultant polyurethanes is not adversely affected. Thus, it is contemplated to utilize a mole ratio of diisocyanate to diol of from 1:1 up to 3:1. The preferred mole ratio range of the diisocyanate to diol is from 1:1 to 2:1.

The time and temperature of the polymerization reaction is dependent upon the molecular weight of the prepolymer and the type of diisocyanate used. Completion of polymerization for the given diol-diisocyanate can be determined by the increase in viscosity of the melt polymer. Generally the temperature of curing can vary from 25° to 100°, while the time of the cure can range from 10 to 30 minutes. It is believed that the invention will be further understood from the following detailed examples.

EXAMPLE I

One pound of dry ethyl ether was added to a 2-liter, 3-necked flask that had been flamed out under nitrogen. The flask was equipped with a condenser, stirrer and addition funnel. To the ethyl ether was added 13.5 grams or 0.35 mole of lithium aluminum hydride. One hundred grams or 0.244 moles of

added dropwise to maintain reflux. The mixture was heated at reflux 15 minutes after the addition was complete. Upon cooling, 15 milliliters of water was added slowly over one hour, and the whole mixture was added to 600 milliliters of 6N $H_2SO_4$ to assure complete hydrolysis of the unreacted hydride. The ether layer was used to extract the water, and the ether solution was distilled giving 69 grams of $HOCH_2(CF_2)_4$ $OCF(CF_3)CH_2$ analysis.

EXAMPLE II

Utilizing the procedure of Example I, 102 grams or .177 mole of

was reduced with 9 grams or 0.237 mole of lithium aluminum hydride. The ether residue was heated at reflux with benzene, using a Dean-Stark apparatus to remove water. Distillation gave 63 grams of $HOCH_2CF(CF_3)O(CF_2)_5 OCF(CF_3)CH_2OH$ identified by infrared, NMR, and elemental analysis.

EXAMPLE III

One hundred forty grams of dry dioxane was added to a 500-milliliter 3-necked flask with a stirrer, condenser, addition funnel and thermometer. 6.8 grams or 0.18 mole of sodium borohydride was added. This was followed by a dropwise addition of 100 grams or 0.135 mole of

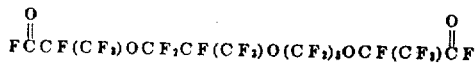

with stirring at 28° to 75° C. over 3 hours. The mixture was heated at 50°-75° C. with stirring for an additional 3 hours and cooled. One hundred milliliters of water was added slowly over one hour, keeping the temperature below 55° C. The mixture was then heated at 75° C. for six hours, to assure complete hydrolysis of unreacted hydride. 100 milliliters of additional water was added and the mixture then allowed to cool. The lower layer was separated and the upper layer was extracted three times with ether. This material was combined, the ether was stripped and the remainder distilled to give 69 grams of $HOCH_2CF(CF_3)OCF_2CF(CF_3)O(CF_2)_5$ $OCF(CF_3)CH_2OH$.

EXAMPLE IV

The procedure set forth in Example III was repeated utilizing 4 grams or 0.106 mole of sodium borohydride, and 45 grams or 0.05 mole of a diacid fluoride having the formula

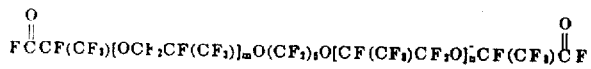

where $m + n = 2$, together with 75 grams of dioxane. The material was dried with magnesium sulfate prior to distillation. This produced 32 grams of the diol having the formula $HOCH_2CF(CF_3)[OCF_2CF(CF_3)]_mO(CF_2)_3O[CF(CF_3)CF_2O]_nCF(CF_3)CH_2OH$
where $m + n = 2$.

EXAMPLE V

The procedure of Example III was repeated, utilizing 3 grams or 0.079 mole of sodium borohydride and 40 grams of 0.037 mole of a diacid fluoride having the formula

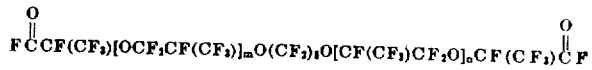

where $m + n = 3$, and 55 grams of dioxane in a 200-milliliter 3-necked flask. Distillation gave 17 grams of the diol having the formula $HOCH_2CF(CF_3)[OCF_2CF(CF_3)]_mO(CF_2)_3$ $O[CF(CF_3cf_2O]_nCF(CF_3)CH_2OH$
where $m + n = 3$.

EXAMPLE VI

In this example a polyurethane was prepared utilizing 8.75 grams or 0.01 mole of the diol product of Example IV, and 2.32 grams or 0.01 mole of tetrafluoro-m-phenylene diisocyanate. The reactants were mixed and heated for 90 minutes at 165° C. and an additional 30 minutes at 185° C. under vacuum to prevent moisture from entering the system and reacting with diisocyanate. The materials were then press cured at 160° C. for 30 minutes at 1,000 psi to produce a sticky, elastomeric, semisolid film.

EXAMPLE VII

Example VI was repeated, however a ratio of diisocyanate to diol of 1.4 to 1 mole produced a hard, clear film having a glass transition temperature of −53° C. and a Shore A hardness of 73.

EXAMPLE VIII 9.75 grams or 0.0094 mole of the diol produced in Example V was mixed with 4.34 grams or 0.0187 of tetrafluoro-m-phenylene diisocyanate. The reactants were heated for 120 minutes at 162° C. forming a thick fluid. This fluid was then placed in a mold for 30 minutes at 160° C. and pressed at 2,000 psi. This produced a clear, hard sheet having a glass transition temperature of −58° C. and a Shore A hardness of 97.

EXAMPLE IX

The tetrafluoro-m-phenylene diisocyanate utilized in the above examples was prepared by reacting tetrafluoro-m-phenylene diamine with chlorocarbonyl pyridinium chloride. One thousand three hundred milliliters of dry diethyl ether was placed in a 3-liter, 5-necked flask equipped with stirrer, thermometer, gas bubbler, two addition funnels and a low temperature condenser. One hundred seventy-three grams of phosgene was added at −50° C. To the phosgene was added 120 grams of pyridine and 250 milliliters of ether slowly at −50° C., forming a yellow solid. After addition, the mixture was stirred 30 minutes at −40° C. Following this, 50 grams of tetrafluoro-m-phenylene diamine was dissolved in 400 milliliters of ether and added as the flask was allowed to warm with stirring to room temperature. The mixture was then stirred 2 hours at 10° to 20° C. The solids were removed by filtration and the solvent removed under vacuum leaving a light yellow liquid. Distillation gave 37 grams of clear tetrafluoro-m-phenylene diisocyanate.

We claim:

1. A polyurethane resin formed by the reaction of an organic diisocyanate with a diol having the formula:

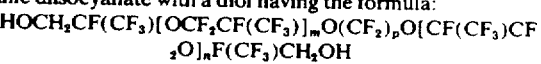

where $p$ is an integer of 2 to 12, and $m$ and $n$ are integers whose sum is from 0 to 20.

2. The resin of claim 1 where the mole ratio of diisocyanate to diol is from 1:1 to 3:1.

3. The resin of claim 2 where the mole ratio of diisocyanate to diol is from 1:1 to 2:1.

4. The resin of claim 1 where the diisocyanate is selected from the group consisting of tetrafluoro-m-phenylene diisocyanate, tetrafluorofluorotrimethylene diisocyanate, and 1-chloro-2,4-diisocyanato-3,5,6-trifluorobenzene.

* * * * *

UNITED STATES PATENT OFFICE
CERTIFICATE OF CORRECTION

Patent No. 3,671,497  Dated June 20, 1972

Inventor(s) Eugene C. Stump, Jr.; Stephen Eugene Rochow

It is certified that error appears in the above-identified patent and that said Letters Patent are hereby corrected as shown below:

In the abstract that portion of the formula reading
"$[OCF,CF(CF_3)]_m$" should read -- $[OCF_2CF(CF_3)]_m$ --

Column 1, lines 68-69, the formula should appear as follows:
-- $HOCH_2CF(CF_3)[OCF_2CF(CF_3)]_mO(CF_2)_pO[CF(CF_3)CF_2O]_nCF(CF_3)CH_2OH$ --

Column 3, line 74, that portion of the formula reading
"$O]_nCF(CF)CH_2OH$" should read -- $O]_nCF(CF_3)CH_2OH$ --

Column 4, line 13, that portion of the formula reading
"$[CF(CF_3cf_2O]_n$" should read -- $[CF(CF_3)CF_2O]_n$ Column 4, lines 68-69, the formula should appear as follows:
-- $HOCH_2CF(CF_3)[OCF_2CF_3)]mO(CF_2)_pO[CF(CF_3)CF_2O]_nCF(CF_3)CH_2OH$ Column 6, line 1, delete "tetrafluorofluorotrimethylene" and insert
-- tetrafluoro-p-phenylene diisocyanate, perfluorotrimethylene --

Signed and sealed this 9th day of January 1973.

(SEAL)
Attest:

EDWARD M. FLETCHER, JR.
Attesting Officer

ROBERT GOTTSCHALK
Commissioner of Patents